(12) United States Patent
Edlinger

(10) Patent No.: US 6,843,828 B2
(45) Date of Patent: Jan. 18, 2005

(54) METHOD FOR TREATING SLAGS OR SLAG MIXTURES ON AN IRON BATH

(75) Inventor: Alfred Edlinger, Bartholomäberg (AT)

(73) Assignee: Holcim Ltd., Jona (CH)

( * ) Notice: Subject to any disclaimer, the term of this patent is extended or adjusted under 35 U.S.C. 154(b) by 155 days.

(21) Appl. No.: 10/182,057

(22) PCT Filed: Jan. 18, 2001

(86) PCT No.: PCT/AT01/00010
§ 371 (c)(1),
(2), (4) Date: Oct. 29, 2002

(87) PCT Pub. No.: WO01/55459
PCT Pub. Date: Aug. 2, 2001

(65) Prior Publication Data
US 2003/0140732 A1 Jul. 31, 2003

(30) Foreign Application Priority Data
Jan. 28, 2000 (AT) .......................... 65/2000 U

(51) Int. Cl.[7] .............................. C21B 11/00
(52) U.S. Cl. ......................................... 75/500
(58) Field of Search ........................... 75/500

(56) References Cited

U.S. PATENT DOCUMENTS 4,304,598 A * 12/1981 von Bogdandy et al. ..... 75/532
6,332,910 B1 * 12/2001 Edlinger ..................... 75/453

FOREIGN PATENT DOCUMENTS

WO    WO 99/14381    3/1999 ............. C21C/5/36

* cited by examiner

Primary Examiner—Melvyn Andrews
(74) Attorney, Agent, or Firm—Chapman and Cutler LLP

(57) ABSTRACT

In a method for treating slags or slag mixtures having iron oxide contents of >5 wt.-%, in particular steelworks slags, in which the steel slags optionally mixed with other slags are charged onto a metal bath, a steel bath having a carbon content of <1.5 wt.-%, preferably <0.5 wt.-%, is used as the metal bath and the steel bath, after the charging of the steel slags, is carburized to above 2.0 wt.-% C, preferably >2.5 wt.-% C, by introducing carbon or carbon carriers.

32 Claims, No Drawings

METHOD FOR TREATING SLAGS OR SLAG MIXTURES ON AN IRON BATH

The invention relates to a method for-treating slags or slag mixtures having iron oxide contents of >5 wt.-%, in particular steelworks slags, in which the steel slags optionally mixed with other slags are charged onto a metal bath.

From EP 666 930 B1, a method for producing steel and hydraulically active binders has already been known, by which steel slags are reduced using pig iron and, in particular, the carbon content present in the pig iron, thus causing the refining of the pig iron bath and the reduction of the carbon content of the bath to, for instance, below half of the carbon content present in the pig iron, on the one hand while, at the same time, causing the iron oxide from the steel slag to be reduced to iron and get into the metal bath. The known method was optimized substantially with a view to enabling the at least partial reduction of large quantities of steel slags using slight amounts of molten pig iron. A substantial curtailment of the method by using larger quantities of molten pig iron is not readily feasible with that known method, wherein, for one part, molten pig iron is usually present at comparatively low temperatures thus eventually rendering problematic the Theological properties of slags and, for the other part, when charging liquid steel slags onto large quantities of molten pig iron, extremely vigorous reactions will be observed, which, in the event of unfavourable Theological properties of the slags, may provoke the formation of undesired foamed slags or the occurrence of slag spittings. The formation of such foamed slags, as a result, will cause a retardation of the reaction such that relatively long treatment times will become necessary.

The invention aims to further develop a method of the initially defined kind to the extent that with a relatively short reaction time the method heat formed in the course of the method can be optimally utilized and a highly fluid steel slag can be maintained during the reduction, which will persistently impede the formation of foamed slags and, at the same time, prevent local overreactions involving undesired liquid slag spittings.

To solve this object, the method according to the invention essentially consists in that a steel bath having a carbon content of <1.5 wt.-%, preferably <0.5 wt.-%, is used as said metal bath and that the steel bath, after the charging of the steel slags, is carburized to above 2.0 wt.-% C, preferably >2.5 wt.-% C, by introducing carbon or carbon carriers. By providing a metal bath having a comparatively low carbon content, i.e. a steel bath, at the onset of the slag reduction, local overreactions and vigorous reactions causing large amounts of gas to be formed will be prevented such that the formation of foamed slag will no longer be observed. In order to conduct such a method in an economical and largely autothermical manner, it is particularly advantageous if the method heat forming in the method is used immediately. Therefore, the method according to the invention advantageously is carried out in a manner that a pig iron bath is provided and refined with oxygen to a carbon content of <0.5 wt.-%, whereby a bath temperature of above 1570° C., in particular about 1620° C., is adjusted, that liquid steel slag is charged onto the refined steel bath and carbon is introduced into the bath after a temperature equalization, wherein $SiO_2$-containing corrective substances such as, e.g., blast furnace slag, quartz sand and/or $Al_2O_3$-containing corrective substances such as, e.g., bauxite are added in order to lower the basicity to <1.5 and to adjust an $Al_2O_3$ content of >10 wt.-%, respectively. By ensuring the formation of a steel bath onto which the steel slags are subsequently charged, immediately as a prestage within the same method by means of a refining procedure, the method heat forming during refining, by which the original pig iron bath is substantially heated, can be directly utilized for a temperature equalization with the steel slag to be applied, wherein it is feasible, due to the high temperature, to immediately melt down, and introduce into the slag, also corrective substances and, in particular, $SiO_2$-containing corrective substances as are required for the adjustment of the desired basicity. Onto the steel bath which is appropriately heated to temperatures of above 1570° C. by the refining procedure is, thus, immediately added either at least a portion of the $SiO_2$-containing corrective substances required for basicity adjustment so as to cause these corrective substances to be heated and at least partially melted, or the steel slag, wherein it is feasible to add the $SiO_2$-containing corrective substances together with the liquid steel slag. Due to the addition of such $SiO_2$-containing corrective substances and, in particular, the opportunity to simultaneously charge additives such as, for instance, cooling scrap or fine ore, the high latent heat of the refined steel bath is directly used in the process and it is feasible, by the addition of iron oxide carriers, to effect an efficient temperature control by which iron oxides are largely reduced at the same time and a high amount of molten iron is, thus, formed of such iron oxide carriers which are usually difficult to process, such as, for instance, fine ores.

Following steel slag charging, the carbon content of the steel bath is then continuously raised and the desired reduction work is performed while blowing carbon carriers into the steel bath. The carbon monoxide formed may subsequently be afterburned such that the method, in the main, can be operated in a largely autothermical manner and the introduction of additional energy can be obviated. Advantageously, the method according to the invention in that case is carried out in a manner that the basicity is adjusted to 1.1. to 1.4 and the carbon content of the bath is adjusted to >2.5 wt.-%.

The method according to the invention advantageously is carried out in a manner that the steel slag is added to the steel bath at a weight quantity ratio of 1:3 to 1:6, preferably about 1:4, whereby the melting heat required for fluxes will be immediately available due to the relatively large quantity of metal bath charged and exhibiting a high temperature level after the refining procedure. In particular, it is feasible in an advantageous manner to add quartz sand in amounts ranging from 150 to 250 kg/ton steel slag, and bauxite in amounts ranging from 200 to 300 kg/ton steel slag, whereby the selected way of addition causes the fluxes to be sufficiently homogenized and hence completely melted and reacted in the slag so as to directly yield a cement-technologically usable product.

In a particularly advantageous manner, the liquid slag mixtures are supplemented with fine ores or iron oxide carriers in order to adjust an iron oxide content of above 8 wt.-%, whereby it is feasible, simultaneously with the desired reduction of the steel slag, to reduce even hardly processible ores by the same method and use this admixture for controlling the desired reaction temperatures. For the same purpose, additives such as, e.g., cooling scrap or fine ores may advantageously be melted down in the metal bath during or after refining.

In a particularly advantageous manner, acidic-gangue iron oxide carriers may be added, thus enabling the appropriate lowering of the basicity to cement-technologically desirable target basicities simultaneously with the reduction of metallic iron from such iron oxide carriers. In doing so, it is advantageously proceeded such that the addition of iron oxide carriers such as, e.g., acidic gangue weak ores or fine ores, after the addition of the molten slags or slag mixtures onto the steel bath, at least partially is effected at the same time as the carburization of the steel bath, corrective substances containing CaO, $Al_2O_3$ and/or $SiO_2$, in general, being advantageously added to the molten slags or slag mixtures.

In the main, the refining procedure carried out in the first stage yields a particularly favourable energy balance with the high energy amounts released during the refining of the pig iron bath being directly usable within the process.

Any desired slags rich in $SiO_2$ are basically suitable for the adjustment of the desired target basicity and $SiO_2$-containing corrective substances may optionally be charged.

In the following, the invention will be explained in more detail by way of an exemplary embodiment.

In a converter, 8 tons of molten pig iron were converted into a steel bath by the introduction of 280 $Nm^3$ oxygen through bottom tuyeres. The directional analysis of the molten pig iron showed a carbon content of 3.9 wt.-%, a silicon content of about 0.3 wt.-% and residual iron. After refining, during which, departing from a bath temperature of 147° C., a final temperature of 1620° C. was reached due to the exothermic reaction occurring, the liquid steel bath had a carbon content of 0.3 wt.-%, a silicon content of 0.003-% and residual iron. After this, 2 tons of liquid steel slag were charged onto that liquid steel bath. The steel slag was characterized by the following analysis:

| Steel slag | |
|---|---|
| | wt. % |
| CaO | 48.6 |
| $SiO_2$ | 19.1 |
| $Al_2O_3$ | 2.2 |
| MgO | 3.2 |
| $TiO_2$ | 1.5 |
| FeO | 22.7 |
| MnO | 2.7 |
| $CaO/SiO_2$ | 2.5 |

Due to the relatively low bath carbon content of the steel bath present, the reduction reaction of the metal oxides contained in the steel slag involves substantially fewer mass conversions immediately upon the addition of the liquid steel slag. If pig iron were directly charged in the respective quantitative ratios, high amounts of CO would be released quickly, which might lead to intensive slag foaming or slag spitting.

After the charging of the steel slag onto the steel bath, temperature equalization between slag and metal bath is effected so as to enable possibly solid slag portions to be completely reconverted into the liquid state. Temperature equalization results in temperatures of about 1500° C.

After temperature equalization had been completed, 580 kg coal were blown into the steel bath at a blowing rate of 25 kg/min; additionally introduced were 370 kg quartz sand at a rate of 24 kg/min and 535 kg bauxite at a rate of 28 kg/min.

A metal bath containing 4.5 wt.-% dissolved carbon at a temperature of about 1490° C. remained at the end of the desired reduction reaction. Depending on the corrective substances selected and the composition of the steel slag, the pig iron thus formed back naturally also may contain respective other metals than iron.

By means of the corrective substances, the desired target basicity as appears desirable for the cement-technological further use of the treated slag was adjusted, on the one hand, while, at the same time effecting a reduction of the metal oxides to the following directional analysis of the treated steel slag.

| Treated steel slag | |
|---|---|
| | wt. % |
| CaO | 44.7 |
| $SiO_2$ | 34.6 |
| $Al_2O_3$ | 14.8 |
| MgO | 2.9 |
| $TiO_2$ | 1.8 |
| FeO | 0.9 |
| MnO | 0.3 |
| $CaO/SiO_2$ | 1.3 |

The thus recovered treated steel slag could be granulated in water and used as a grinding additive in composite cements.

The heat formed during decarburization, i.e. burning of carbon, enables the heating and melting of the corrective substances required for the adjustment of the desired target basicity and the adjustment of the desired composition aimed at a cement-technologically usable grinding additive. An undesiredly high temperature level optionally developing may again be reduced to the desired reduction temperature by the addition of cooling scrap, fine ores or charging substances derived from the direct reduction of iron (DRI, HBI), thus allowing additional iron to be introduced into the metal bath.

To the extent it appears necessary, the carbon monoxide formed in the reduction may be afterburned above the slag bath, thus enabling the simultaneous processing of an elevated amount of acidic fine ores without any additional introduction of energy.

What is claimed is:

1. A method for treating slags having iron oxide contents of greater than 5 percent by weight to form iron by reduction, comprising the steps of:
    charging the slags having iron oxide contents of greater than 5 percent by weight onto a steel bath having a carbon content of less than 1.5 percent by weight, and
    adding at least one of the group consisting of carbon and carbon carriers into said steel bath, whereby said steel bath is carburized to above 2.0 percent carbon by weight.

2. A method according to claim 1, wherein said slags are charged onto a steel bath having a carbon content of less than 0.5 percent carbon by weight.

3. A method according to claim 1, wherein said steel bath is carburized to above 2.5 percent carbon by weight.

4. A method according to claim 2, wherein said steel bath is carburized to above 2.5 percent carbon by weight.

5. A method according to claim 1, wherein a pig iron bath is provided and refined with oxygen to a carbon content of less than 0.5 percent carbon by weight, whereby a bath temperature of above 1570° C. is provided, liquid steel slag is charged onto the refined steel bath, and carbon is introduced into the bath after a temperature equalization, wherein at least one $SiO_2$-containing corrective substance and/or at least one $Al_2O_3$-containing corrective substance are added in order to lower the basicity to a value less than 1.5, and to adjust an $Al_2O_3$ content of less than ten percent by weight, respectively.

6. A method according to claim 5, wherein said at least one $SiO_2$-containing corrective substance is at least one of the group consisting of blast furnace slag and quartz sand.

7. A method according to claim 5, wherein said $Al_2O_3$-containing corrective substance is bauxite.

8. A method according to claim 5, wherein said bath temperature is adjusted to about 1620° C.

9. A method according to claim 1, wherein the basicity, defined as the ratio $CaO/SiO_2$, is adjusted to 1.1 to 1.4 and the carbon content of the steel bath is adjusted to greater than 2.5 percent carbon by weight.

10. A method according to claim 2, wherein the basicity, defined as the ratio $CaO/SiO_2$, is adjusted to 1.1 to 1.4 and the carbon content of the bath is adjusted to greater than 2.5 percent carbon by weight.

11. A method according to claim 1, wherein the slags are added to the bath at a weight quantity ratio, defined as weight of slags/weight of the steel bath, of 1:3 to 1:6.

12. A method according to claim 1, wherein the slags are added to the bath at a weight quantity ratio, defined as weight of slags/weight of the steel bath, of about 1:4.

13. A method according to claim 5, wherein quartz sand in amounts ranging from 150 to 250 kg/ton steel slag, and bauxite in amounts ranging from 200 to 300 kg/ton steel slag, are added.

14. A method according to claim 1, wherein fine ores or iron oxide carriers are added to the molten slag mixtures in order to adjust the iron oxide content to greater than 8 percent by weight.

15. A method according to claim 5, wherein fine ores or iron oxide carriers are added to the molten slag mixtures in order to adjust the iron oxide content to greater than 8 percent by weight.

16. A method according to claim 9, wherein fine ores or iron oxide carriers are added to the molten slag mixtures in order to adjust the iron oxide content to greater than 8 percent by weight.

17. A method according to claim 10, wherein fine ores or iron oxide carriers are added to the molten slag mixtures in order to adjust the iron oxide content to greater than 8 percent by weight.

18. A method according to claim 13, wherein fine ores or iron oxide carriers are added to the molten slag mixtures in order to adjust the iron oxide content to greater than 8 percent by weight.

19. A method according to claim 1, wherein the addition of iron oxide carriers after the addition of the molten slags or slag mixtures onto the steel bath, at least partially is effected at the same time as the carburization of the steel bath.

20. A method according to claim 5, wherein the addition of iron oxide carriers after the addition of the molten slags or slag mixtures onto the steel bath, at least partially is effected at the same rime as the carburization of the steel bath.

21. A method according to claim 9, wherein the addition of iron oxide carriers after the addition of the molten slags or slag mixtures onto the steel bath, at least partially is effected at the same time as the carburization of the steel bath.

22. A method according to claim 1, wherein corrective substances containing $CaO$, $Al_2O_3$, and/or $SiO_2$ are added to the molten slags or slag mixtures.

23. A method according to claim 5, wherein corrective substance containing $CaO$, $Al_2O_3$, and/or $SiO_2$ are added to the molten slags or slag mixtures.

24. A method according to claim 9, wherein corrective substances containing $CaO$, $Al_2O_3$, and/or $SiO_2$ are added to the molten slags or slag mixtures.

25. A method according to claim 1, wherein one or more additives selected from the group consisting of cooling scrap, fine ores and sponge iron are melted down in the metal bath during or after refining.

26. A method according to claim 5, wherein one or more additives selected from the group consisting of cooling scrap, fine ores and sponge iron are melted down in the metal bath during or after refining.

27. A method according to claim 9, wherein one or more additives selected from the group consisting of cooling scrap, fine ores and sponge iron are melted down in the metal bath during or after refining.

28. A method according to claim 13, wherein one or more additives selected from the group consisting of cooling scrap, fine ores and sponge iron are melted down in the metal bath during or after refining.

29. A method according to claim 1, wherein the stags having iron oxide contents of greater than 5 percent by weight are steelworks slags.

30. A method according to claim 19, wherein the iron oxide carriers are one or more selected from the group consisting of acidic gangue weak ores and fine ores.

31. A method according to claim 20, wherein the iron oxide carriers are one or more selected from the group consisting of acidic gangue weak ores and fine ores.

32. A method according to claim 21, wherein the iron oxide carriers are one or more selected from the group consisting of acidic gangue weak ores and fine ores.

* * * * *